Patented Apr. 10, 1951

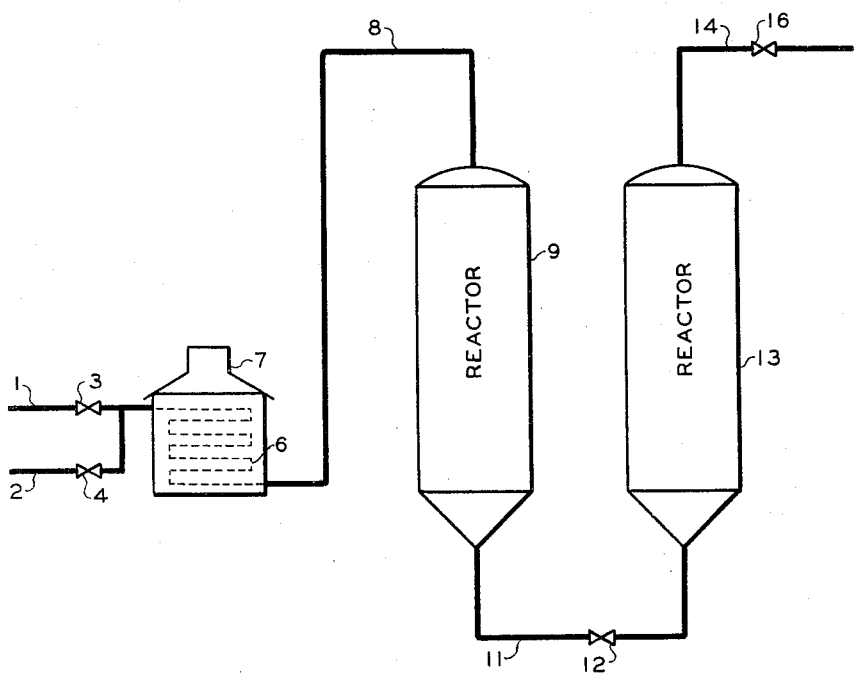

2,548,619

UNITED STATES PATENT OFFICE 2,548,619

REMOVAL OF ACETYLENE FROM HYDROCARBON MIXTURES

Gardner C. Ray, Bartlesville, Okla., assignor to Phillips Petroleum Company, a corporation of Delaware Application June 28, 1948, Serial No. 35,536

6 Claims. (Cl. 260—677)

This invention relates to the removal of acetylene from hydrocarbon mixtures. More specifically it relates to a process for the removal of acetylene from an ethylene-acetylene mixture by selective oxidation of the acetylene.

In the production of olefinic hydrocarbons by the cracking of hydrocarbon gases, certain quantities of acetylene are produced, the actual amount depending upon such factors as the cracking conditions, and the nature of the feed stock. In working up the cracking effluent for the purpose of recovering the gaseous olefinic hydrocarbons, the compounds having less than three carbon atoms are usually contained in the same fraction, the acetylene content usually being of the order of 2 per cent or less. If the ethylene is to be recovered by the cuprous salt method, it is necessary that the acetylene be first removed from the stream, since acetylene reacts with cuprous ions to form an explosive compound which is easily detonated.

I have discovered that acetylene present in such a hydrocarbon stream can be quantitatively removed by selective oxidation with a minimum amount of oxygen and in the presence of a catalyst comprising a difficultly reducible oxide of a metal selected from the group consisting of groups IIA and IIIB of the periodic table and silicon. By the term difficultly reducible metal oxides, I mean those oxides that are not readily reduced to the metals by carbon at temperatures encountered in catalytic processes. It is necessary that my metal oxide catalyst be one of the group of difficultly reducible oxides because the process operates at a temperature in the neighborhood of 450° C. and carbon is present in considerable quantities until it is oxidized.

It is therefore an object of my invention to provide a process for the removal of acetylene from a hydrocarbon stream.

It is another object of my invention to provide a process for the selective oxidation of acetylene in the presence of ethylene.

It is a further object of my invention to provide a suitable catalyst for the selective oxidation of acetylene.

Further objects and advantages of my invention will be apparent to those skilled in the art upon reading the following specification, claims, and the appended drawing.

The single drawing is an elevational view of a system wherein the acetylene-containing gas and oxygen are passed over the catalyst and the resulting gaseous mixture is passed through another reactor to remove the unreacted oxygen.

In the drawing, influent lines 1 and 2 controlled by valves 3 and 4 are connected to coil 6 of heater 7. The effluent from said coil flows through line 8 into reactor 9 and thence through line 11, controlled by valve 12, into a second reactor 13. The gases leave said reactor through line 14 controlled by valve 16 to an external storage or further process, not shown.

Operation

In the production of olefinic hydrocarbons by the cracking of hydrocarbon gases or liquids, a small amount of acetylene is produced. In working up the cracking effluent for the purpose of recovering the gaseous olefinic hydrocarbons, said effluent is usually separated into fractions, one of which fractions contains hydrogen, methane, ethane, ethylene, and acetylene. As has been previously stated, it is necessary that the acetylene be removed from the fraction, particularly if the ethylene is to be recovered by the use of cuprous salt reagents, since acetylene reacts with these reagents even at very low partial pressures. It is possible to remove the acetylene from such a stream by selective oxidation in the presence of a suitable catalyst. In my invention porous alumina, bauxite, silica gel, and the oxides of magnesium, barium, and calcium are more desirable because of their low cost and ready availability. Activated alumina is preferred because of its long life and high activity.

In the practicing of my invention, in connection with the apparatus shown in the drawing, to the ethylene-acetylene stream flowing through line 1 is introduced, through line 2, an amount of oxygen slightly in excess of that necessary to burn all of the acetylene and any co-present hydrogen. It is preferred to introduce an excess of about 5 per cent of oxygen over that required for complete combustion of the acetylene. The reaction mixture then flows through coil 6 of heater 7, where it is heated to a temperature between 300 and 500° C., the preferred reaction temperature being 350 to 450° C. The heated gases flow through line 8 into reactor 9, which contains a suitable catalyst. The catalyst chamber is preferably operated at a pressure of from 0 to 10 p. s. i. g., and the gaseous reactants are passed through said reactor at a space velocity of from 200 to 1500 standard volumes of gas per volume of catalyst per hour, depending on the other conditions of the reactor and the composition of the gas stream. I prefer a space velocity of 300 to 800 standard volumes of gas per volume of catalyst per hour.

My invention may be carried out over a wide range of pressures and superatmospheric pressures may be conveniently used in many cases. The upper limit will, in general, be determined by the amount of ethylene present because of the tendency of ethylene to polymerize to undesirable products at high pressures.

The acetylene-free effluent from reactor 9 will contain unburned hydrocarbons, carbon dioxide, water vapor and a small amount of oxygen. To remove this small amount of oxygen, the stream may be passed into reactor 13 which contains copper, or iron or other metal turnings at a temperature of approximately 350° C., where any free oxygen present in the stream is removed. Any of a number of conventional methods of oxygen removal may be used instead of the one suggested. The oxygen-free acetylene-free hydrocarbon stream is now ready for separation of the ethylene by the cuprous salt method or any other method preferred.

The oxidation of acetylene may be slowed down or accelerated, as desired, by adjusting the temperature and pressure of the reactor.

Specific example

A mixture of 1.2 volume per cent $C_2H_2$, 10.4 volume per cent $C_2H_4$, 2.3 volume per cent $O_2$, and 86.1 volume per cent $N_2$ was passed over a catalyst bed of activated alumina pellets at a rate of 300 standard cc. per cc. of catalyst per hour. The catalyst was held at a temperature of 425 to 450° C. and the pressure was atmospheric. Analysis of the effluent gas showed that nitrogen and ethylene had passed through the catalyst bed unchanged and that acetylene was quantitatively burned to $CO_2$ and water.

While I have described my invention with respect to a specific example and have illustrated a preferred form of apparatus for carrying out the operations incident to my process, it will be well understood that various obvious changes may be made by those skilled in the art without departing from the scope of my invention as defined by the following claims.

Having described my invention, I claim:

1. A process for the removal of acetylene from a gaseous hydrocarbon mixture which comprises adding to said mixture an amount of oxygen slightly in excess of that amount required to completely oxidize said acetylene and passing said oxygen containing mixture over a catalyst comprising a difficultly reducible metal oxide selected from the group consisting of porous alumina, magnesium oxide, calcium oxide, and barium oxide at a temperature of 350 to 450° C.

2. A process for the removal of acetylene from a gaseous hydrocarbon mixture which comprises adding to said mixture an amount of oxygen slightly in excess of that amount required to completely oxidize the acetylene and passing said oxygen containing mixture over a catalyst comprising a difficultly reducible metal oxide selected from the group consisting of porous alumina, magnesium oxide, calcium oxide, and barium oxide at a temperature of 300 to 500° C.

3. The process according to claim 2 wherein the catalyst is porous alumina.

4. The process according to claim 2 wherein the catalyst is magnesium oxide.

5. The process according to claim 2 wherein the catalyst is barium oxide.

6. The process according to claim 2 wherein the catalyst is calcium oxide.

GARDNER C. RAY.

REFERENCES CITED

The following references are of record in the file of this patent:

UNITED STATES PATENTS

| Number | Name | Date |
|---|---|---|
| 1,836,927 | Linckh et al. | Dec. 15, 1931 |
| 2,381,707 | Wood et al. | Aug. 7, 1945 |

FOREIGN PATENTS

| Number | Country | Date |
|---|---|---|
| 288,216 | Great Britain | Jan. 31, 1929 |
| 555,597 | Great Britain | Aug. 30, 1943 |